United States Patent [19]

Shiga et al.

[11] Patent Number: 5,593,178
[45] Date of Patent: Jan. 14, 1997

[54] STEERING WHEEL WITH AIR BAG AND HORN SWITCH

[75] Inventors: Ichizou Shiga, Aichi-ken; Atsushi Nagata, Inazawa; Tooru Koyama, Aichi-ken; Katsunobu Sakane, Ichinomiya, all of Japan

[73] Assignee: Toyoda Gosei Co., Ltd., Nishikasugai-gun, Japan

[21] Appl. No.: 530,461

[22] Filed: Dec. 1, 1995

[30] Foreign Application Priority Data

Dec. 7, 1994 [JP] Japan .................................. 6-303759
Oct. 9, 1995 [JP] Japan .................................. 7-261807

[51] Int. Cl.$^6$ ............................ B60R 21/20; H01H 9/00
[52] U.S. Cl. ...................................... 280/731; 200/61.55
[58] Field of Search ............................ 280/731, 728.2; 200/61.55, 61.54, 61.56

[56] References Cited

U.S. PATENT DOCUMENTS

| | | | |
|---|---|---|---|
| 4,785,144 | 11/1988 | Fosnaugh et al. | 280/731 |
| 4,938,503 | 7/1990 | Muraoka et al. | 280/731 |
| 5,228,362 | 7/1993 | Chen et al. | 280/731 |
| 5,235,146 | 8/1993 | Suzuki | 280/731 |
| 5,356,173 | 10/1994 | Hongou et al. | 280/731 |
| 5,410,114 | 4/1995 | Furuie et al. | 200/61.55 |

FOREIGN PATENT DOCUMENTS

| | | | |
|---|---|---|---|
| 63-184544 | 7/1988 | Japan | 280/728.2 |
| 3-79471 | 4/1991 | Japan . | |
| 4-287768 | 10/1992 | Japan | 280/731 |

Primary Examiner—Brian L. Johnson
Assistant Examiner—Peter C. English
Attorney, Agent, or Firm—Cushman Darby & Cushman IP Group of Pillsbury Madison & Sutro LLP

[57] ABSTRACT

An air bag device is arranged at an upper portion of a steering wheel body, and horn switch mechanisms are arranged between a mandrel of the steering wheel body and a bag holder of the air bag device. The mandrel comprises a plurality of brackets each having an engaging member which is opened at a lower portion thereof and which extends horizontally. Upward movement of the bag holder is restricted by mounting screws threadedly engaged with mounting holes in the bag holder, the screws extend from below the engaging members of the brackets. The bag holder is retained by the mandrel in a manner to be movable downwardly.

6 Claims, 7 Drawing Sheets

STEERING WHEEL WITH AIR BAG AND HORN SWITCH

BACKGROUND OF THE INVENTION

The invention relates to a steering wheel provided with an air bag device and, more particularly, to a steering wheel in which horn switch mechanisms are arranged between the air bag device and a steering wheel body.

In the prior art, a steering wheel provided with an air bag device and having horn switch mechanisms arranged respectively between a mandrel of a steering wheel body and a bag holder of the air bag device has been known from Japanese Patent Unexamined Publication No. 3-79471 (79471/1991).

The steering wheel disclosed in the above-described publication is such that either of upper and lower contact pieces which form the horn switch mechanisms, that is, the lower contact pieces formed by the mandrel of the steering wheel body, and the upper contact pieces and the bag holders of the air bag device are connected to each other by mounting screws.

The upper contact pieces connected to the bag holder are biased upwardly by two coil springs, which are interposed between the lower contact pieces and the upper contact pieces, and spaced from the lower contact pieces. A distance of the spacing between the upper and lower contact pieces is restricted by restriction screws which are threaded into the lower contact pieces.

The coil springs and the restriction screws are arranged such that the two contact pieces are prevented from being energized by an insulation member. Further, the pairs of upper and lower contact pieces are arranged respectively on right and left sides of the steering wheel.

In the steering wheel disclosed in the aforesaid publication, when the horn switch mechanisms are to be operated, a pad of the air bag device is pushed down to cause the upper contact pieces, which are connected to the bag holder of the air bag device by the mounting screws, to be moved downwardly against biasing forces of the coil springs, so that electrical contacts thereof come into contact with electrical contacts of the lower contact pieces to operate the horn.

However, in the steering wheel disclosed in the aforementioned publication, when the air bag of the air bag device expands, the bag holder is moved downwardly at an initial stage under the influence of a pressure upon expansion. At the time of completion of expansion, the bag holder will be moved upwardly by an inertia force produced by the expansion of the air bag.

Specifically, at the beginning of the expansion of the air bag, the bag holder is moved downwardly with the result that the upper contact pieces come into contact with the contacts of the lower contact pieces. Since the lower contact pieces are provided by the mandrel, it is possible to easily ensure a structure having a strength which sufficiently opposes the pressure by which the bag holder is moved.

However, at the time of completion of the expansion of the air bag, the bag holder will move upwardly to produce a force which acts upon the upper contact pieces, causing the upper contact pieces to separate from the restriction screws (a force opposed against the restriction screws). Thus, the upper contact pieces are required to be of high strength.

Thus, in the prior-art steering wheel, a strength of the upper contact pieces per se, the strength of the restriction screws per se which restrict upward movement of the upper contact pieces and a mounting strength, with which the restriction screws are threaddedly engaged with the lower contact pieces must be ensured. This disadvantageously limits the degree of freedom in the design of the steering wheel mechanism.

SUMMARY OF THE INVENTION

The invention solves the above-described problem, and an object of the invention is to provide a steering wheel which improves the degree of freedom in design of horn switch mechanisms arranged between an air bag device and a steering wheel body.

According to the invention, there is provided a steering wheel including an air bag device arranged at an upper portion of a steering wheel body, and horn switch mechanisms arranged between a mandrel of the steering wheel body and a bag holder of the air bag device.

The horn switch mechanisms comprise a plurality of pairs of upper and lower contact pieces, of which contacts are vertically spaced from and contact with each other to actuate a horn.

The mandrel is provided with a plurality of brackets each having an engaging member which has an opening at a lower portion thereof and extends in a horizontal direction.

The bag holder comprises abutments adapted to abut against upper surfaces of the contacts of the upper contact pieces of the horn switch mechanisms, and mounting holes disposed below the engaging members.

The bag holder is restricted in upward movement by mounting screws which extend through the opening in the engaging members of the brackets and are threaddedly engaged with the mounting holes in the bag holder. The bag holder is retained by the mandrel in a manner to be movable downwardly.

In the above-described steering wheel, each of the upper contact pieces has a C-shape made of a metal plate spring and is insulatingly arranged on the mandrel. Each of the lower contact pieces is arranged on the mandrel in contact therewith. The bag holder is made of a metal having electric conductivity, and one pole side of a horn operating circuit is connected to one of the upper contact pieces, the other pole side of the horn operating circuit being connected to the mandrel.

Further, in the above-described steering wheel, insulating plates for holding the upper contact pieces are fixed to the mandrel, and the insulating plates and the bag holder are provided respectively with engaging projections and engaging holes which are engaged with each other in a vertical direction.

In the steering wheel according to the invention, the bag holder is restricted in upward movement by the mounting screws which are adapted to be inserted through the lower openings in the engaging members of the mandrel. The bag holder is movable downwardly to be retained on the mandrel.

Specifically, in the steering wheel according to the invention, what is retained by the mandrel is a bag holder of the air bag device and is not the upper contact pieces of the horn switch mechanisms as in the conventional arrangement, so that when the bag holder moves upwardly, the mounting screws interfere with the engaging members of the mandrel to restrict the upward movement of the bag holder. Accordingly, the structure of the invention takes into consideration a strength of a connection, by which the bag holder is connected to the mandrel. Thus, it is not necessary to take into consideration a strength of the horn switch mechanism, so that it is possible to improve the degree of freedom in the design of the horn switch mechanism.

In the case where the bag holder moves downwardly at an initial stage of expansion of the air bag, the abutments of the bag holder push down the contacts of the upper contact pieces of the horn switch mechanism to cause the contacts of the upper contact pieces to come into contact with the contacts of the lower contact pieces. The lower contact pieces are supported by the mandrel to be restricted in downward movement, so that it is not necessary to take into consideration the strength of the horn switch mechanism in designing the assembly. Moreover, the bag holder is capable of moving downwardly without causing the mounting screws to interfere with openings in the engaging members of the mandrel, which members restrict the mounting screws. The bag holder thus moves downwardly without hindrance.

Accordingly, in the steering wheel according to the invention, it is possible to improve the degree of freedom in the design of the horn switch mechanisms arranged between the air bag device and the steering wheel body.

The steering wheel is such that each of the upper contact pieces has a C-shape made of a metal plate spring and is insulatingly arranged on the mandrel, and each of the lower contact pieces is arranged on the mandrel into contact therewith. The bag holder is made of a metal having electric conductivity, one pole side of the horn operating circuit is connected to one of the upper contact pieces, and the other pole side of the horn operating circuit is connected to the mandrel. Thus, the steering wheel provides the following functions and effects.

Specifically, even if one or more of the plurality of the upper contact pieces is not directly connected to the one pole of the horn operating circuit, each of the upper contact pieces abuts against the bag holder. Accordingly, one or more of the upper contact pieces is connected to the one pole of the horn operating circuit through the bag holder whereby it becomes unnecessary to connect the lead wire, which is connected to the one pole of the horn operating circuit, to all of the upper contact pieces. It is possible to reduce the assembling man-hours of the steering wheel and the number of the constitutional parts.

Moreover, in the steering wheel, in which the insulating plates for holding the upper contact pieces are fixed to the mandrel, and the engaging legs and the engaging holes adapted to engage with each other in the vertical direction are provided respectively on the insulating plates and in the bag holder, a work for threadedly engaging the mounting screws with the mounting holes in the bag holder can be performed easily after the engaging legs are engaged respectively with the engaging holes so that the bag holder is engaged with the insulating plates to be temporarily fastened thereto. Furthermore, downward movement of the bag holder during the operation of the horn is guided by the engaging legs to enable smooth operation of the horn.

DESCRIPTION OF THE PREFERRED EMBODIMENTS

An embodiment of the invention will hereunder be described with reference to the accompanying drawings.

Figure 1:
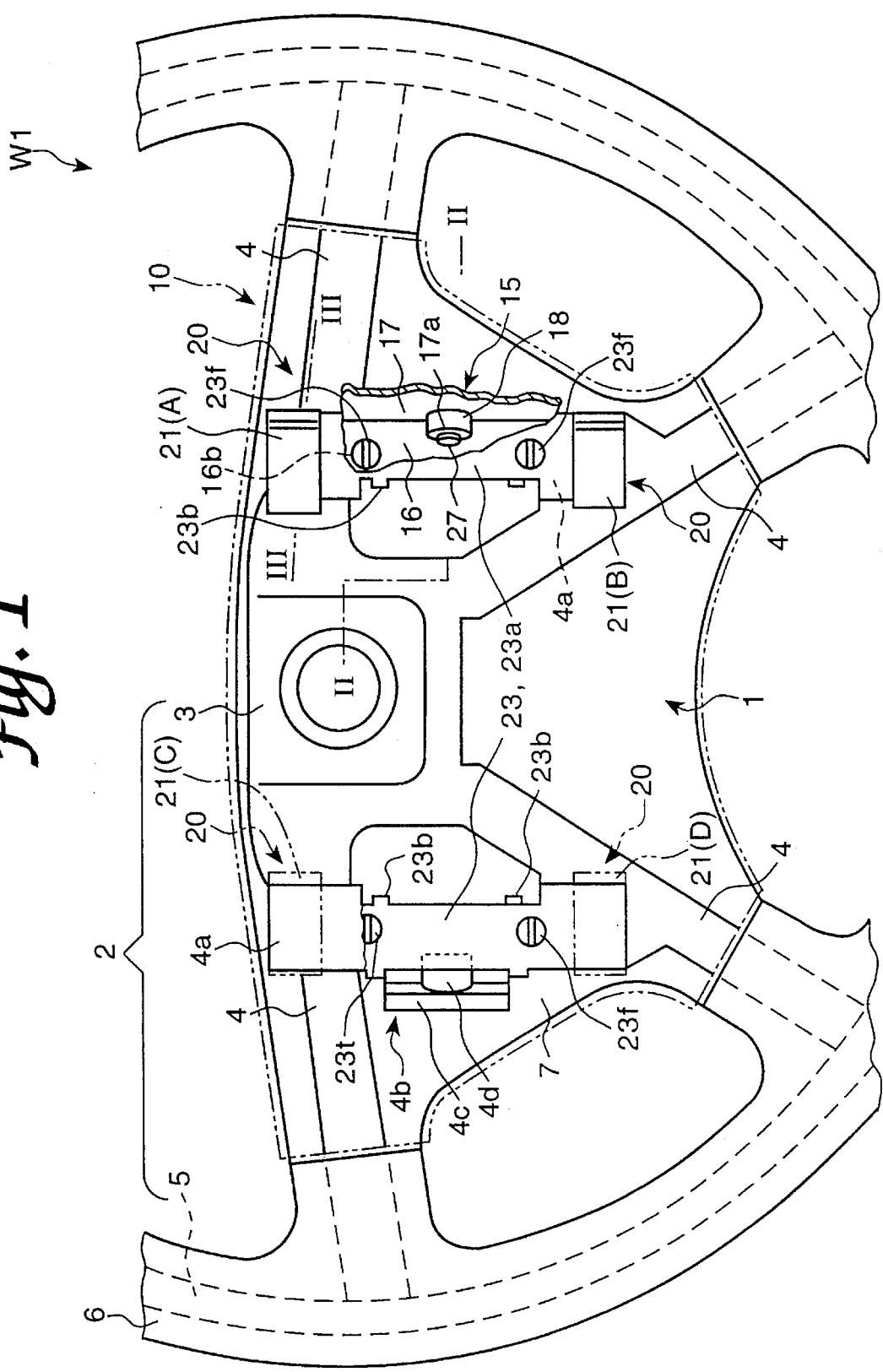
FIG. 1 is a plan view of a steering wheel according to an embodiment of the invention with certain parts thereof omitted for clarity of illustration.
Figure 2:
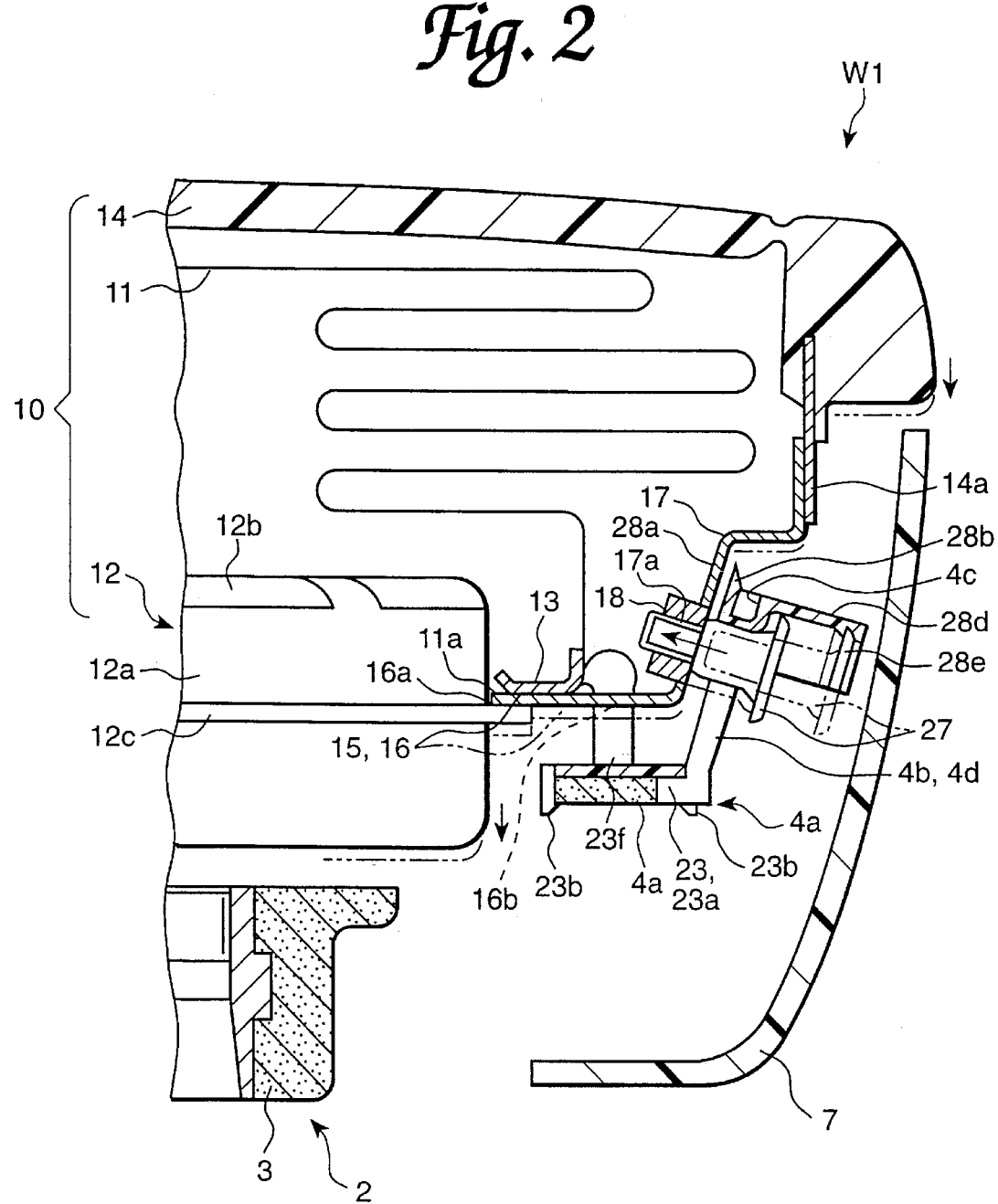
FIG. 2 is an enlarged, partial cross-sectional view, taken along the line II—II in FIG. 1.
Figure 3:
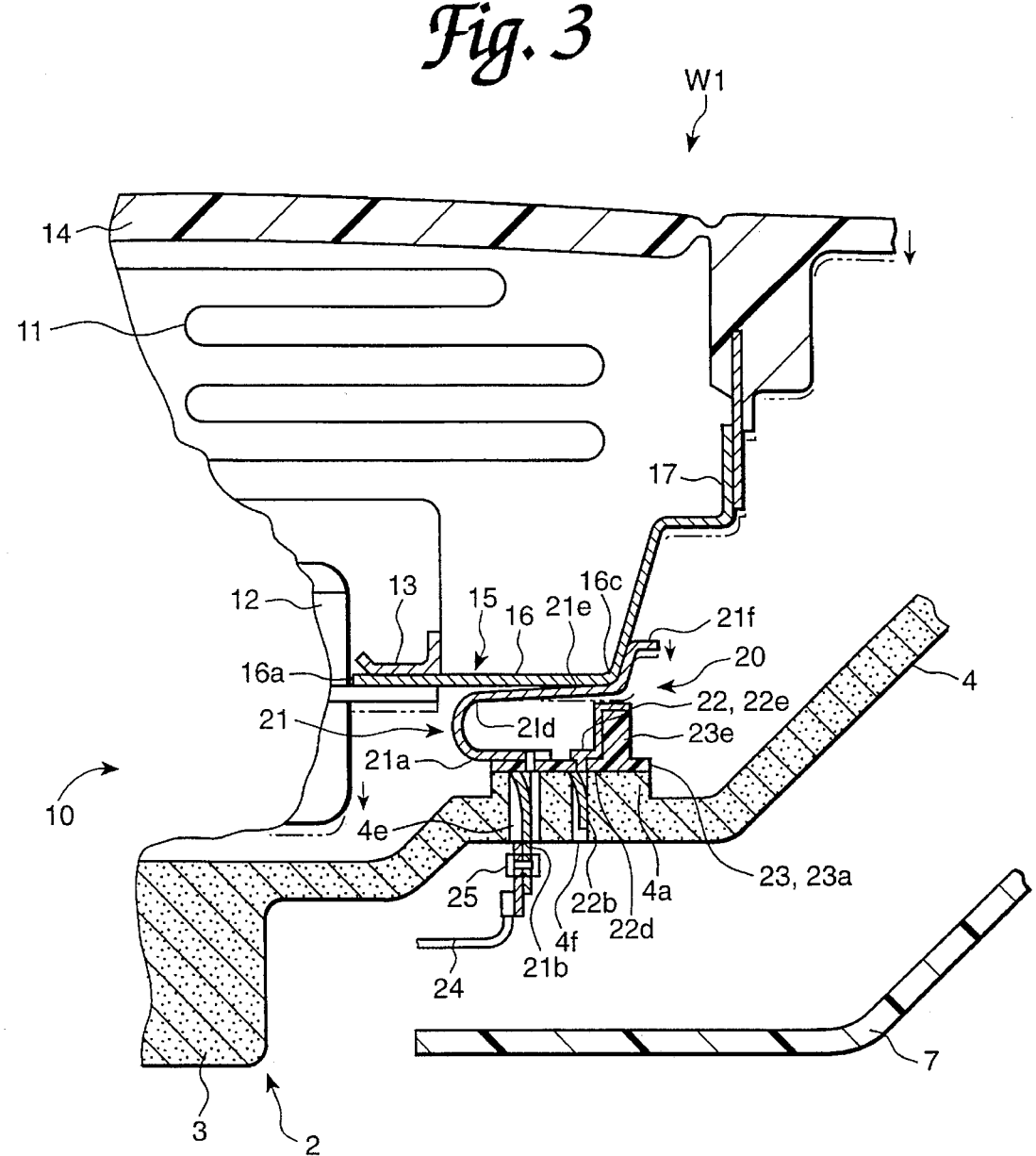
FIG. 3 is an enlarged, partial cross-sectional view, taken along the line III—III in FIG. 1.

As shown in FIGS. 1 to 3, a steering wheel W1 according to the embodiment is constructed such that an air bag device 10 is arranged at an upper part of a steering wheel body 1. Horn switch mechanisms 20 are arranged respectively between a mandrel 2 of the steering wheel body 1 and a bag holder 15 of the air bag device 10.

The steering wheel body 1 comprises the mandrel 2 formed, by die casting, from an aluminum alloy or the like, a covering layer 6 made of synthetic resin for covering predetermined parts of the mandrel 2, and a lower cover 7 for covering lower parts of the mandrel. The mandrel 2 comprises a boss mandrel 3 at a center thereof, an annular ring mandrel 5 and four spoke mandrels 4 which connect the boss mandrel 3 and the ring mandrel 5 to each other.

The spoke mandrels 4 are formed at the left and right sides thereof with supports 4a which connect the front and rear spoke mandrels 4 to each other. In this connection, the mandrel 2 is laterally symmetric.

Figure 4:
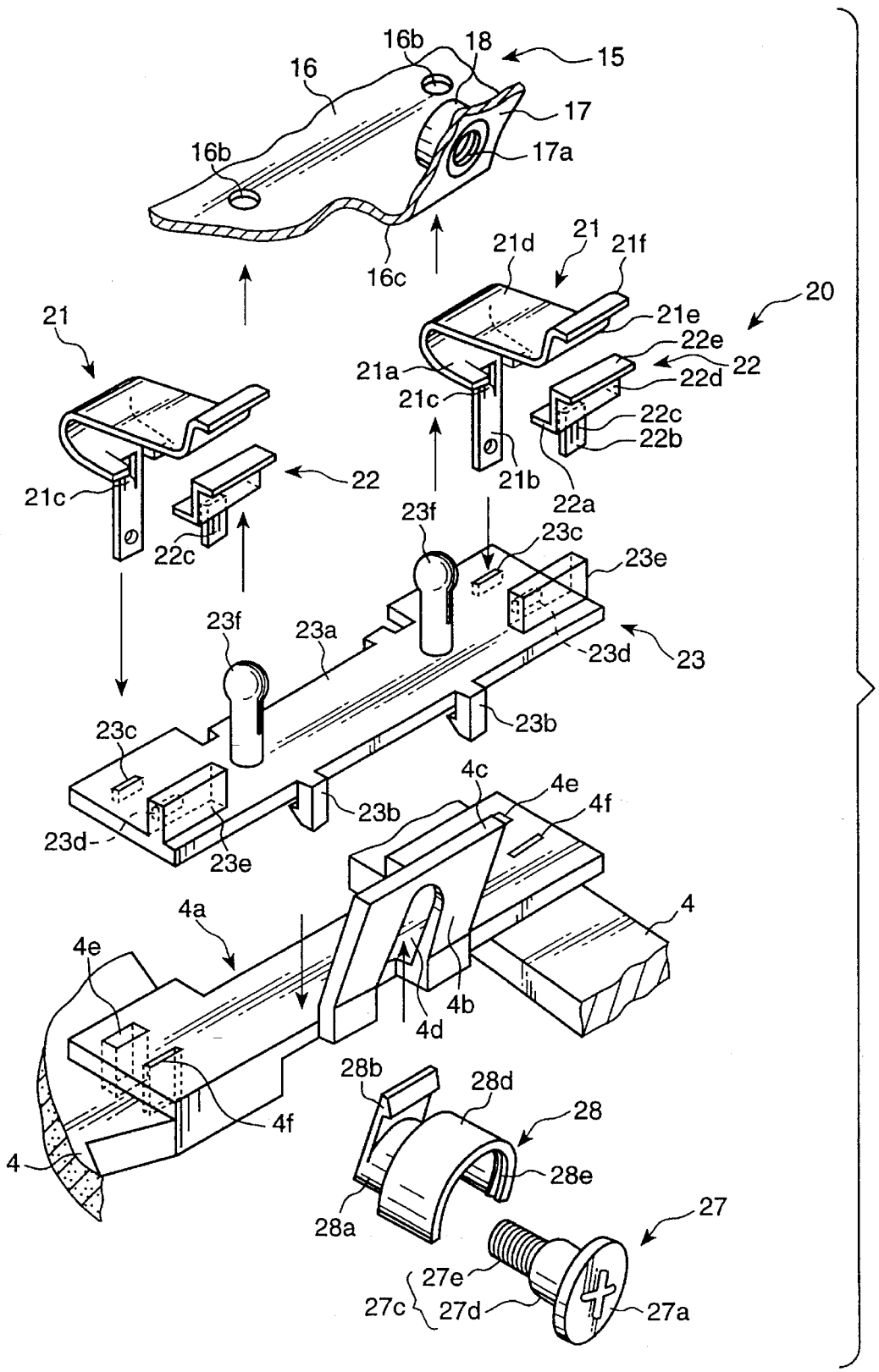
FIG. 4 is an exploded perspective view showing a horn switch mechanism of the steering wheel of FIG. 1.

As shown in FIGS. 1, 2 and 4, each of the supports 4a is formed at an outer edge thereof with a bracket 4b which extends obliquely outwardly. The bracket 4b is formed with an opening 4d, and is provided at an upper end thereof with an engaging member or rod 4c which extends generally horizontally. Moreover, each of the supports 4a is formed, in a longitudinal direction, with through holes 4e and 4f which extend in a vertical direction (FIG. 3).

The air bag device 10 comprises a sack-like air bag 11 adapted to be folded up for storage, an inflator 12 for supplying expansion gas to the air bag 11, a pad 14 for covering the folded-up air bag 11, and the bag holder 15 for supporting the air bag 11, the inflator 12 and the pad 14.

The air bag 11 and the inflator 12 are retained to the bag holder 15 in such a manner that bolts (not shown) which extend from an annular retainer 13 are inserted through a peripheral edge of an opening 11a of the air bag 11, a bottom wall 16 of the bag holder 15 and a flange 12c of the inflator 12 to be threaded into respective nuts.

Further, the pad 14 is retained to the bag holder 15 in such a manner that rivets (not shown) are utilized to fasten a side wall 14a of the pad 14 to a side wall 17 of the bag holder 15.

The bag holder 15 is provided with a rectangular bottom wall 16 and the side wall 17 which extends upwardly from a peripheral edge of the bottom wall 16, and is formed by a metal plate having electric conductivity.

An insertion hole 16a, through which an inflator body 12a provided with a gas discharge hole 12b of the inflator 12 is inserted, is defined at a center of the bottom wall 16. Moreover, engaging holes 16b extend vertically through the bottom wall 16, in pairs, in the vicinity of the left and right both sides thereof. Mounting holes 17a to which nuts 18 are respectively secured are formed respectively at the left and right portions of the side wall 17. In this connection, the mounting hole 17a is positioned such that, under a condition in which the horn switch mechanism 20 is not operated (under a condition in which contacts 21e of upper contact pieces 21 to be described subsequently, are not in contact with contacts 22e of lower contact pieces 22), a mounting fastener or screw 27 adapted to be threadedly engaged with the mounting hole 17a can be arranged below the engaging rod 4c on the bracket 4b of the spoke mandrel 4.

The horn switch mechanisms 20 are constructed such that the pair of upper contact pieces 21 and the pair of lower contact pieces 22, which have the contacts 21e and 22e opposed against each other in the vertical direction, are arranged at four locations in the vicinity of front and rear edges of the supports 4a on the respective spoke mandrel 4. In this connection, the four sets of upper and lower contact pieces 21 and 22, respectively, are of the same shape or configuration. Further, the four sets of upper and lower contact pieces 21 and 22 are symmetrically arranged on the left and right portions of the steering wheel W1.

Each of the upper contact pieces 21 is of a C-shaped construction comprising a base 21a and a movable part 21d extending obliquely upwardly from an end of the base 21a. An engaging leg 21b which extends downwardly is provided on the base 21a. The engaging leg 21b is formed with a cutout 21c which is adapted to be engaged with the peripheral edge of an associated through hole 23c in an insulating plate 23, described in more detail below. The movable part 21d is formed at an upper part thereof with the contact 21e, and is formed at an upper end thereof with a bent portion 21f. The bent portion 21f has a configuration which corresponds to an external profile of a connection between the bottom wall 16 and the side wall 17 of the bag holder 15. In this connection, a portion of the bag holder 15 against which the bent portion 21f abuts forms an abutment 16c of the bag holder 15.

Each of the lower contact pieces 22 is provided with a base 22a and a bent portion 22d which extends upwardly from an end of the base 22a. An upper bent part of the bent portion 22d serves as the contact 22e. The base 22a is provided with an engaging leg 22b which extends downwardly therefrom. The engaging leg 22b is formed with a cutout 22c which is adapted to be engaged with a peripheral edge of an associated through hole 23d in the insulating plate 23, the function of which will be described below.

Each of the insulating plates 23, made of synthetic resin, is arranged between the upper and lower contact pieces 21 and 22 and the support 4a of the spoke mandrel 4. The insulating plates 23 are arranged symmetrically, in the lateral direction of the steering wheel W1. Each of the insulating plates 23 is provided with a rectangular base 23a which is substantially the same in shape or configuration as the support 4a. Engaging pawls 23b which extend downwardly from the base 23a are formed respectively in the lateral edge of the base 23a. These engaging pawls 23b are adapted to be engaged with the support 4a, and serve to fix the associated insulating plate 23 to the support 4a. Moreover, the base 23a is formed with the through holes 23c and 23c, in pairs, in the vicinity of the front and rear edges thereof. The through holes 23c are formed at positions which correspond respectively with the through holes 4e when the engaging pawls 23b are used to fix the insulating plate 23 to the support 4a. The peripheral edges of the through holes 23c serve to latch the cutouts 21c of the respective upper contact pieces 21. The through holes 23d are formed at positions which correspond respectively with the through holes 4f, and peripheral edges thereof serve to latch the cutouts 22c of the respective lower contact pieces 22.

In connection with the above, when the cutouts 21c and 22c of the engaging legs 21b and 22b are used to engage the upper contact pieces 21 and the lower contact pieces 22 with the insulating plate 23 and, thereafter, the engaging pawls 23b are used to fix the insulating plate 23 to the support 4a, the engaging legs 21b of the respective upper contact pieces 21 do not contact with the support 4a through the respective through holes 4e. On the other hand, when the insulating plate 23 is fixed to the support 4a, the engaging legs 22b of the lower contact pieces 22 come into contact with inner peripheral surfaces of the through-holes 4f in the support 4a. After the insulating plate 23 has been fixed to the support 4a, a rivet 25 is used to connect a lead wire 24, which is electrically connected to a positive electrode side of a horn operating circuit, to the engaging leg 21b of the one upper contact piece 21. Incidentally, a negative electrode side of the horn operating circuit is electrically connected to the mandrel 2.

Furthermore, the insulating plate 23 is formed in the vicinity of the respective through holes 23d with support projections 23e which project upwardly. The support projections 23e support, respectively, the contacts 22e of the respective lower contact pieces 22.

Further, the insulating plate 23 is provided in the vicinity of arrangement parts of the engaging pawls 23b with two engaging legs 23f which project upwardly. These engaging legs 23f are inserted respectively into and are engaged respectively with, the engaging holes 16b in the bag holder 15.

The mounting fastener in the form of a screw 27 is threadedly engaged with the mounting hole 17a in the bag holder 15 and comprises a head 27a and a shank 27c which extends from the head 27a. The shank 27c has a large-diameter portion 27d and a small-diameter portion 27e having a male thread formed thereon. The small-diameter portion 27e may be threadedly engaged with a nut 18 of the mounting hole 17a. The large-diameter portion 27d interferes with a lower surface of the engaging rod 4c on the bracket 4b of the mandrel 4 through a holder 28 when the mounting screw 27 is threadedly engaged with the mounting hole 17a.

The holder 28 is preferably of an insulating synthetic resin and comprises a mounting base 28a provided with an engaging hook 28b adapted to hang on an upper edge of an inward surface of the engaging rod 4c, and adapted to be engaged with the lower surface of the engaging rod 4c and a temporary fastening tube 28d in the form of a semi-cylinder which projects from an outer peripheral edge of the mounting base 28a. The temporary fastening tube 28d is formed at an inner peripheral surface thereof with a groove 28e which can temporarily fasten the head 27a of the mounting screw 27 without having the small-diameter part 27e projecting from an inner surface of the bracket 4b.

Assembling of the steering wheel W1 according to the embodiment will be described with reference to FIGS. 1–4. First, the cutouts 21c and 22c are engaged respectively with the predetermined through holes 23c and 23d to fix the upper and lower contact pieces 21 and 22 to the insulating plate 23. The engaging pawls 23b are engaged with the support 4a to fix the insulating plate 23 to the support 4a. Subsequently, the lead wire 24 is connected to the engaging leg 21b of the predetermined upper contact piece 21.

The connection 16c of the bag holder 15 in the previously assembled air bag device 10 abuts against the upper surfaces of the contacts 21e of the respective upper contact pieces 21 in the horn switch mechanisms 20, and the engaging legs 23f of the respective insulating plates 23 are inserted into and engaged with the engaging holes 16b in the bag holder 15.

Subsequently, the mounting screws 27, having been temporarily fastened to the holders 28, are pressed inwardly and are disengaged from the holders 28 to have the small-diameter portions 27e threadedly engaged with the mounting holes 17a in the bag holder 15, thereby permitting the air bag device 10 to be mounted on the mandrel 2.

In this connection, prior to mounting of the air bag device 10, the boss mandrel 3 is used to connect the steering wheel body 1 to a steering shaft (not shown) of the vehicle.

In the steering wheel W1 having been mounted on the vehicle in this manner, if the pad 14 of the air bag device 10 is pressed upon operation of the horn, the bag holder 15 of the air bag device 10 causes the contacts 21e of the respective upper contact pieces 21 to contact respectively with the contacts 22e of the respective lower contact pieces 22 through the abutments 16c, as indicated by a two-dot-and-chain line in FIG. 3. Thus, the horn is operated.

In connection with the above, upon downward movement of the air bag device 10, the mounting screws 27 also move downwardly. However, since the opening 4d is formed below the engaging rod 4c of the respective bracket 4b, and the holder 28 having been latched on the bracket 4b also opens a lower part of the temporary fastened tube 28d, the respective mounting screw 27 can move downwardly without interfering with the bracket 4b and the holder 28.

Moreover, since the engaging legs 23f which extend vertically from the insulating plate 23 fixed to the mandrel 2 are inserted respectively through the engaging holes 16b in the bag holder 15 and the abutments 16c of the bag holder 15 abut against the bent portions 21f of the respective upper contact pieces 21, the air bag device 10 smoothly moves downwardly upon operation of the horn without moving in the horizontal direction.

When the air bag device 10 is operated and the air bag 11 is expanded, the bag holder 15 is pressed downwardly at an initial stage. Accordingly, in a similar manner to the operation of the horn, the contacts 21e of the respective upper contact pieces 21 abut respectively against the contacts 22e of the respective lower contact pieces 22, so that the bag holder abutments 16c are supported by the supports 4a of the mandrel 4. Thus, the bag holder 15 is firmly supported.

Subsequently, at the time of completion of the expansion of the air bag 11, the bag holder 15 is pulled upwardly by the inertia force of the air bag 11. However, the bag holder 15 is restricted by the engaging rods 4c of the brackets 4b through the mounting screws 27 and the holders 28. Thus, the bag holder 15 is firmly supported.

Accordingly, in the steering wheel W1 according to the embodiment, even if the bag holder 15 of the air bag device 10 moves upwardly at the time of completion of the expansion of the air bag 11, the bag holder 15 is restricted by the spoke mandrel 4. Thus, the horn switch mechanisms in the invention are not connected to the mandrel as in the conventional device, thus no consideration may be paid to the strength of the horn switch mechanisms 20. Accordingly, it is possible to improve the degree of freedom in the design of the horn switch mechanisms 20.

Moreover, in the steering wheel W1 according to the embodiment, even if the upper contact pieces 21(B), 21(C) and 21(D) (see FIG. 1) of the four upper contact pieces 21 are not directly connected to one pole of the horn operating circuit, the respective upper contact pieces 21 abut against the bag holder 15. Thus, the upper contact pieces 21(B), 21(C) and 21(D) are conducted to the positive pole of the horn operating circuit through the bag holder 15. Thus, when the lead wire 24 connected to the one pole of the horn operating circuit is connected to the one upper contact piece 21(A), the lead wire 24 is not required to be connected to the other upper contact pieces 21(B), 21(C) and 21(D). Therefore, it is possible to reduce assembling man-hours and the number of constitutional parts of the steering wheel W1.

Furthermore, in the steering wheel W1 according to the embodiment, the insulating plates 23 for holding the upper contact pieces 21 are fixed onto the supports 4a of the mandrel 4, and the engaging legs 23f and the engaging holes 16b which are engaged respectively with each other in the vertical direction are provided respectively on the insulating plates 23 and in the bag holder 15. Accordingly, upon assembly of the steering wheel W1, the engaging legs 23f are engaged respectively with the engaging holes 16b so that the bag holder 15 is temporarily fastened to the insulating plates 23. Thus, it is possible to easily perform a work in threading the mounting screws 27 into the mounting holes 17a in the bag holder 15. Further, upon downward movement of the bag holder 15 at the time of the operation of the horn, the engaging legs 23f guide the downward movement. Thus, it is possible to operate the horn smoothly.

In connection with the above, in the steering wheel W1 according to the embodiment, the engaging rods 4c on the mandrel 4 against which the mounting screws 27 threadedly engaged with the mounting holes 17a in the bag holder 15 abut are arranged at the upper edges of the openings 4d which are opened at the lower portions thereof. However, the opening 4d may be an elongated hole which is formed in an obliquely extending portion of the bracket 4b, and of which an upper edge serves as the engaging rod 4c.

Figure 5:
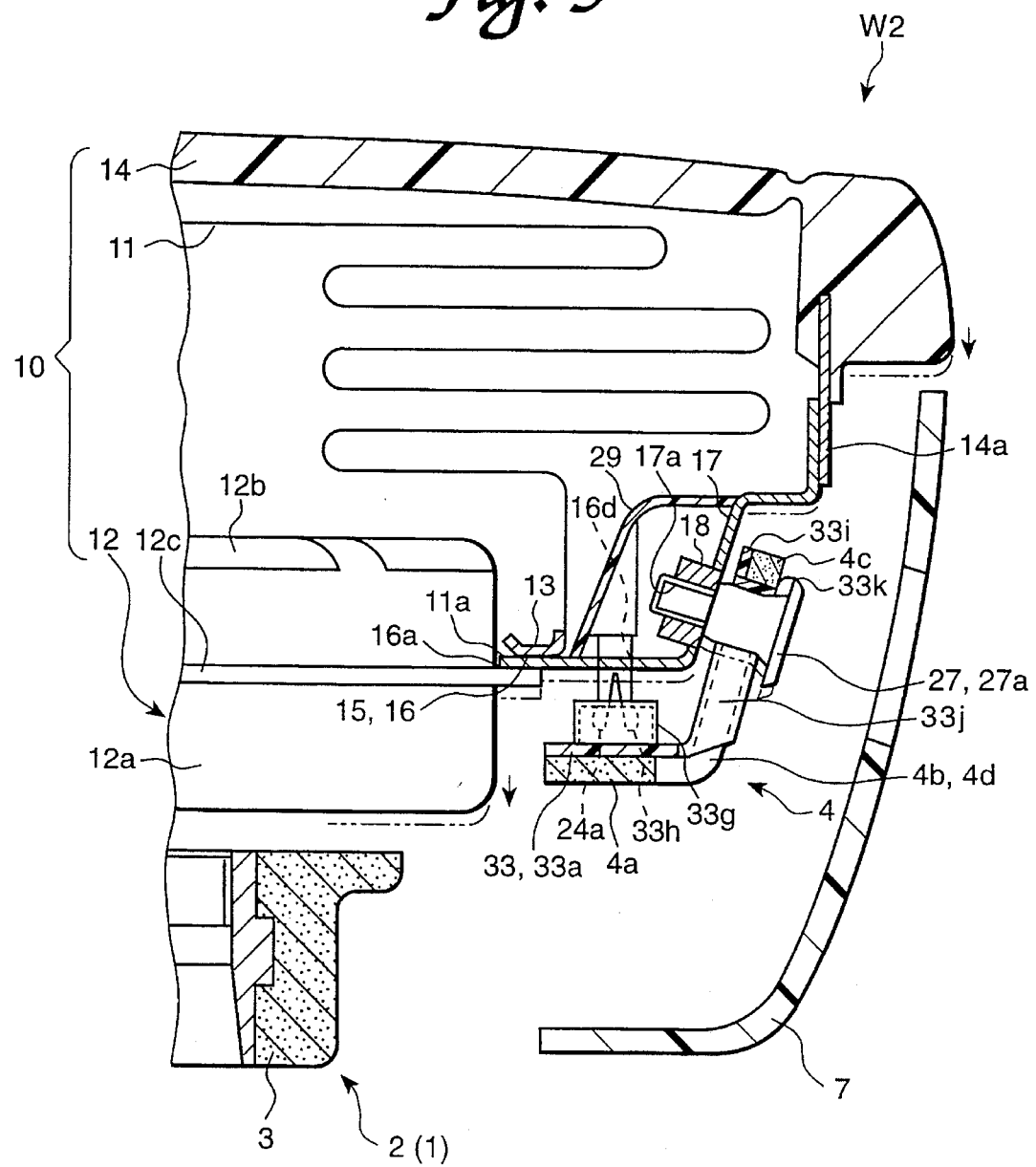
FIG. 5 is a sectional view of another embodiment of a steering wheel showing a position corresponding to that shown in FIG. 2.
Figure 6:
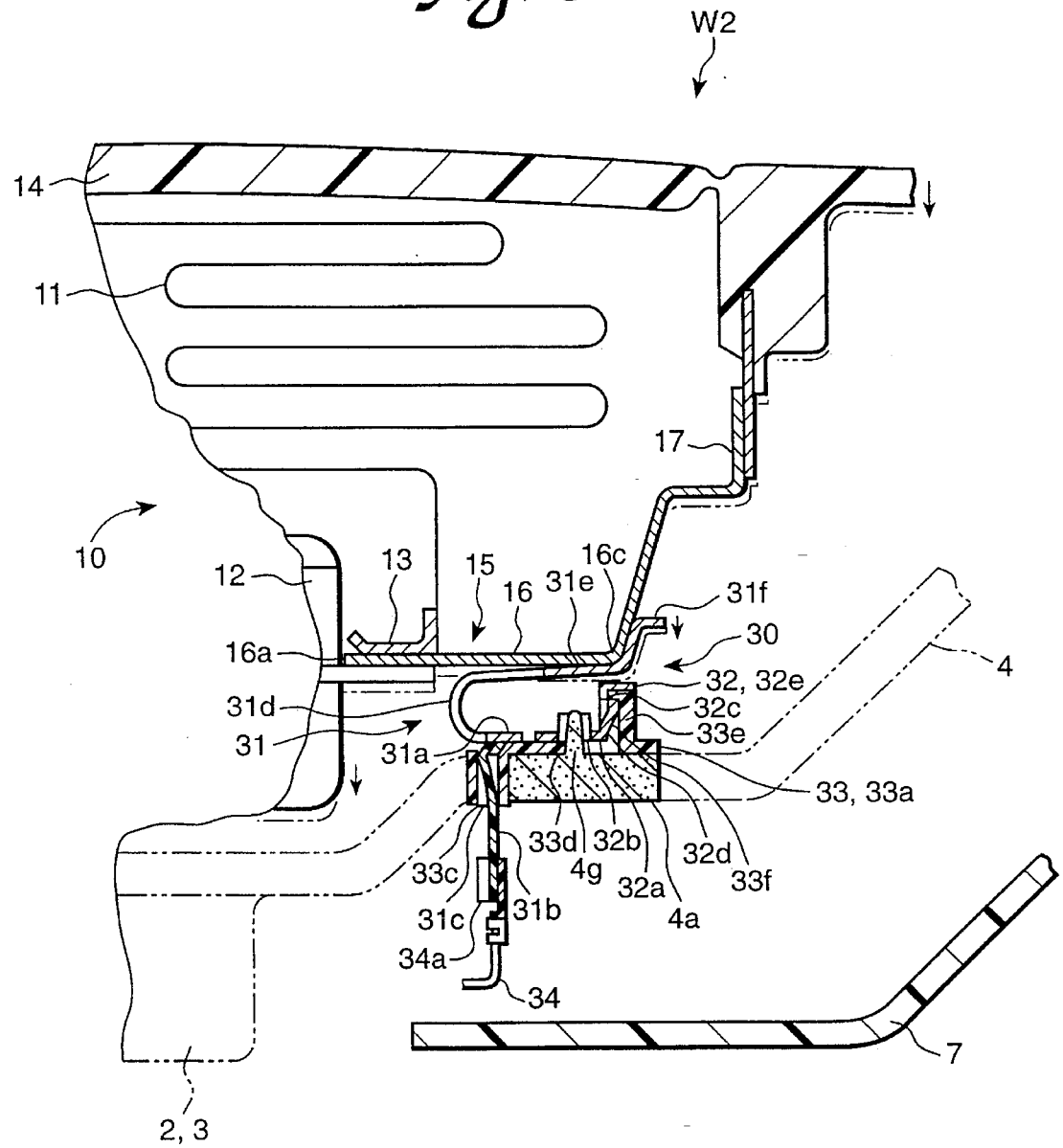
FIG. 6 is a sectional view of the steering wheel of FIG. 5 showing a position corresponding to FIG. 3.
Figure 7:
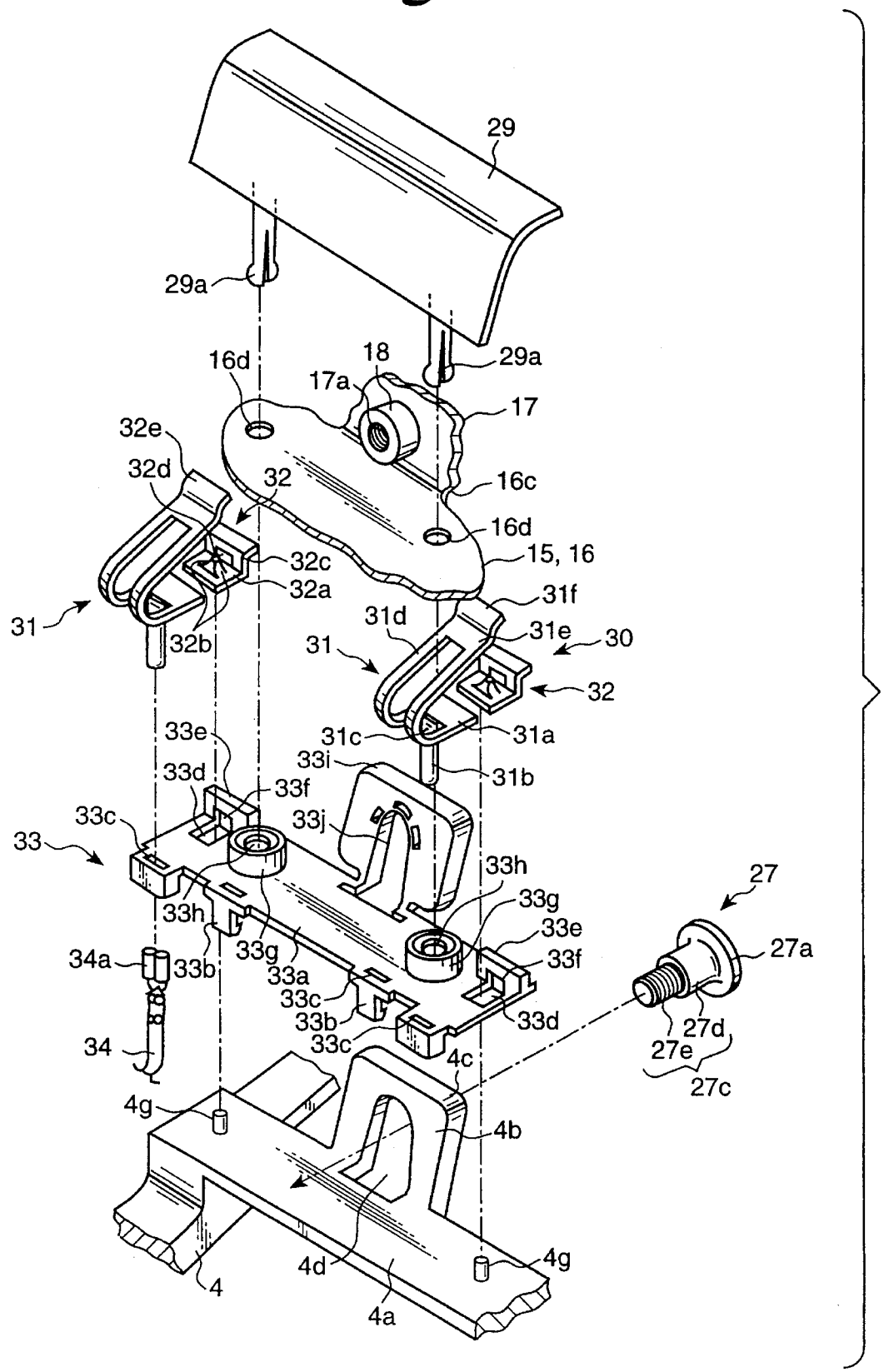
FIG. 7 is an exploded perspective view showing a horn switch mechanism of the steering wheel of FIG. 5.

Although the steering wheel W1 illustrated and described for the above embodiment has the bag holder 15 provided with the engaging holes 16b, and the insulating plate 23 provided with the engaging legs 23f, the arrangement may be reversed as seen in a steering wheel W2 shown in FIGS. 5 to 7.

Horn switch mechanisms 30 of a steering wheel W2 are constructed similar to the horn switch mechanisms 20, such that a pair of upper contact pieces 31 and a pair of lower contact pieces 32 which have contacts 31e and 32e opposed against each other in the vertical direction are arranged at four locations in the vicinity of front and rear edges of the supports 4a on the four spoke mandrels 4. In this connection, the four sets of upper and lower contact pieces 31 and 32, respectively, are the same in shape or configuration. Further, the four sets of upper and lower contact pieces 31 and 32 are symmetrically arranged on the left and right portions of the steering wheel W2. In addition, in the steering wheel W2, the mandrel 2 of the steering wheel body 1 is substantially the same as that of the steering wheel W1, but has a construction in which fitting projections 4g are formed instead of the through holes 4e and 4f in the two supports 4a.

Each of the upper contact pieces 31 is of a C-shaped construction comprising a base 31a and a movable part 31d extending obliquely upwardly from an end of the base 31a. An engaging leg 31b which extends downwardly is provided on the base 31a. The engaging leg 31b is formed with a cutout 31c which is adapted to be engaged with the peripheral edge of an associated through hole 33c in an insulating plate 33 to be described below. The movable part 31d is formed at its upper part with the contact 31e, and is formed at the upper end thereof with a bent portion 31f which corresponds to an external profile of a connection between the bottom wall 16 and the side wall 17 of the bag holder 15, and abuts against an abutment 16c of the bag holder 15.

Each of the lower contact pieces 32 is provided with a base 32a and a bent portion 32c which extends upwardly from an end of the base 32a. An upper bent part of the bent portion 32c serves as the contact 32e. The base 32a is provided with a pair of cutouts 32b which are opened at their center and extend upwardly. Inserted into these cutouts 32b are the fitting projections 4g which are formed in the supports 4a on the respective spoke mandrel 4. The bent portion 32c is formed with a cutout 32d which is adapted to be engaged with a peripheral edge of an insulating plate engaging hole 33f for mounting the lower contact piece 32 on the insulating plate 33.

Each of the insulating plates 33, preferably made of synthetic resin, is arranged between the upper and lower contact pieces 31 and 32 and the support 4a of the spoke mandrel 4. The insulating plates 33 are arranged symmetrically in a lateral direction of the steering wheel W2. Each of the insulating plates 33 is provided with a rectangular base 33a which is substantially the same in shape as the support 4a. A pair of engaging pawls 33b which extend downwardly is formed in one edge of the base 33a, and a cover 33i is formed in the other edge of the base 33a. The engaging pawls 33b are adapted to be engaged with the support 4a. The cover 33i is adapted to fit in and engage with a bracket 4b of the support 4a so as to cover the inner peripheral surface of an opening 4d in the bracket 4b. Formed on the inner peripheral edge of an opening 33j is an engaging hook 33k which is adapted to engage with the inner peripheral edge of the opening 4d in the bracket 4b. The insulating plate 33 is fixed on the support 4a through engagement between the engaging pawls 33b and the engaging hook 33k. Moreover, the base 33a is formed with the through holes 33c and 33d two apiece in the vicinity of the front and rear edges thereof. The through holes 33c are formed at positions which are respectively away from the support 4a when the engaging pawls 33b and the engaging hook 33k on the cover 33i are used to fix the insulating plate 33 to the support 4a. The through holes 33d are formed at positions which correspond respectively with the fitting projections 4g when the insulating plate 33 is fixed to the support 4a, as described above. Also formed on the insulating plate 33 are support projections 33e, each of which extends upwardly in the vicinity of each through hole 33d. The support projection 33e serves to support the contact 32e of the lower contact piece 32. An engaging hole 33f is formed in the support projection 33e at a position close to the through hole 33d to engage with the cutout 32d of the lower contact piece 32.

In connection with the above, when the cutouts 31c and 32d of the engaging legs 31b and the bent portions 32c are used to engage the upper contact pieces 31 and the lower contact pieces 32 with the insulating plate 33 and, thereafter, the engaging pawls 33b and the engaging hook 33k of the cover 33i are used to fix the insulating plate 33 to the support 4a, the engaging legs 31b of the respective upper contact pieces 31 do not contact with the support 4a depending upon the positions of the respective through holes 33c. On the other hand, the pair of cutouts 32b of the respective lower contact pieces 32 are inserted over the fitting projections 4g of the support 4a to come into contact with the fitting projections 4g. After the insulating plate 33 has been fixed to the support 4a, a terminal 34a is used to connect a lead wire 34, which is electrically connected to a positive electrode side of the horn operating circuit, to the engaging leg 31b of the one upper contact piece 31. Incidentally, a negative electrode side of the horn operating circuit is electrically connected to the mandrel 2.

Furthermore, the insulating plate 33 is formed in the vicinity of the respective cutouts 33b with mounting bosses 33g which are provided with engaging holes 33h and project upwardly. These engaging holes 33h engage with engaging legs 29a which are provided in the bag holder 15 and project through the through holes 16d. Each engaging leg 29a projects, in this embodiment, from a cover member 29 covering the positions where the nuts 18 are located. The cover member 29 is made of synthetic resin, and made integral with the bag holder 15 by engaging an engaging leg (not shown) with an engaging hole formed in a predetermined position of the bag holder 15.

When the insulating plate 33 is injection molded, the cover 33i is molded to be plate-shaped along the base 33a. When the cover 33i is fixed to the support 4a, it is assembled on the bracket 4b of the support 4a by bending upright from the base 33a.

Assembling of the steering wheel W2 of the above disclosed embodiment will be described. First, the upper and lower contact pieces 31 and 32 are mounted on the respective insulating plates 33 to fix them to the support 4a. Subsequently, the lead wire 34 is connected to the engaging leg 31b of the predetermined upper contact piece 31.

Thereafter, the boss mandrel 3 is used to connect the steering wheel body 1 to a steering shaft (not shown). Then, the abutment 16c of the bag holder 15 in the previously assembled air bag device 10 is made to abut against the upper surface of the contacts 31e of the respective upper contact pieces in the horn switch mechanisms 30, and the respective engaging legs 29a of the bag holder 15 are inserted into and engaged with the engaging holes 33h of the respective insulating plates 33. In addition, the mounting screws 27 are threaded into the mounting holes 17a in the bag holder 15 through the openings 33j, thereby permitting the air bag device 10 to be mounted on the mandrel 2, and assembling the steering wheel W2.

In the steering wheel W2, if the pad 14 is pressed, the bag holder 15 causes the contacts 31e of the respective upper contact pieces 31 to contact respectively with the contacts 32e of the respective lower contact pieces 32 through the abutment 16c, as indicated by a two-dot-and-chain line in FIG. 6 so that the horn can be operated. At this moment, the respective engaging legs 29a prevent undesired movement to allow smooth operation.

When the air bag device 10 is operated, the bag holder 15 is pressed downwardly at an initial stage. Accordingly, in a similar manner to the operation of the horn, the bag holder is firmly supported by the support 4a of the mandrel 4. At the time of completion of inflation, the bag holder 15 is firmly supported by the engaging rods 4c of the brackets 4b through the mounting screws 27 and the cover 33i.

The steering wheel W2 can attain the same effect as the steering wheel W1 because the bag holder 15 abuts against the respective upper contact pieces 31, and it is sufficient to connect the lead wire 34 to only one of the upper contact pieces 31.

Furthermore, in this steering wheel W2, since the insulating plate 33 is shaped to integrally connect the holder 28 to the insulating plate 33, it is possible to reduce the number of components by one as compared with the steering wheel W1. Moreover, since the respective contact pieces 32 are made to come into contact with the mandrel 4 by fitting the fitting projections 4g in the cutouts 32b, the conduction can be stabled to the negative electrode side of the horn operating circuit of the respective lower contact pieces 32.

While the invention has been described in connection with what is presently considered to be the most practical and preferred embodiments, it is understood that the invention is not limited to the disclosed embodiments; but, on the contrary, is intended to cover various modifications and equivalent arrangements included within the spirit and scope of the appended claims.

What is claimed is:

1. A steering wheel assembly comprising:

a steering wheel body including a mandrel, said mandrel including a plurality of brackets, each of said brackets having an opening therein, an air bag device arranged at an upper portion of said steering wheel body and including a bag holder, horn switch mechanisms arranged between the mandrel of the steering wheel body and the bag holder, said switch mechanisms including a plurality of pairs of upper and lower contact pieces, said upper and lower contact pieces of each pair being vertically spaced from each other in a first position and constructed and arranged to contact each other in a second position to actuate the horn, said bag holder including abutments constructed and arranged to abut against surfaces of contacts of said upper contact pieces and including mounting holes generally adjacent said openings in said brackets, a mounting fastener in each opening, each of said mounting fasteners having a portion engaging with an associated one of said mounting holes to mount said bag holder with respect to said mandrel in such a manner that the bag holder is restricted from moving upwardly with respect to the brackets but capable of moving downwardly with respect to the brackets.

2. A steering wheel according to claim 1, wherein each of said upper contact pieces has a C-shape, is made of a metal plate spring and is insulatingly arranged on the mandrel, and each of said lower contact pieces is arranged on the mandrel in contact therewith, wherein said bag holder is made of a metal having electric conductivity, and one pole side of a horn operating circuit is connected to one of said upper contact pieces, the other pole side of the horn operating circuit being connected to said mandrel.

3. A steering wheel according to claim 1 or claim 2, wherein insulating plates for holding said upper contact pieces are fixed to the mandrel, said insulating plates and said bag holder being formed respectively with engaging legs and engaging holes which are engaged respectively with each other in a vertical direction.

4. A steering wheel according to claim 1, wherein each of said brackets has a channel therein defining said opening, said channel being open at one end thereof permitting said bag holder to move downwardly.

5. A steering wheel according to claim 4, further comprising a fastener holder associated with each said mounting fastener, each of said holders including a portion extending through said channel and engaged with an associated one of said brackets, and a portion constructed and arranged to engage an associated one of said mounting fasteners said mounting fasteners preventing upward movement of the bag holder due to contact with said holders and said bag holder being movable downwardly upon downward, guided movement of said mounting fasteners with respect to said holders.

6. A steering wheel according to claim 5, wherein each of said mounting fasteners includes a portion disposed within an associated one of said mounting holes and a portion engageable with an associated one of said holders.

\* \* \* \* \*